(12) United States Patent
Uramoto

(10) Patent No.: US 8,122,515 B2
(45) Date of Patent: Feb. 21, 2012

(54) ACCESS CONTROL WITH DECOMPOSABLE VALUES AND ITS APPLICATION FOR VIRTUAL WORLDS

(75) Inventor: Naohiko Uramoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 12/197,129

(22) Filed: Aug. 22, 2008

(65) Prior Publication Data
US 2009/0144282 A1 Jun. 4, 2009

(30) Foreign Application Priority Data
Nov. 30, 2007 (JP) ................................. 2007-311726

(51) Int. Cl.
*G06F 17/30* (2006.01)
(52) U.S. Cl. ............... 726/27; 726/2; 707/785; 707/705; 715/706; 713/167
(58) Field of Classification Search .................. None
See application file for complete search history.

(56) References Cited

U.S. PATENT DOCUMENTS

| | | | |
|---|---|---|---|
| 6,647,388 B2* | 11/2003 | Numao et al. ........................ 1/1 |
| 7,653,936 B2* | 1/2010 | Oberst ................................ 726/7 |
| 7,752,161 B2* | 7/2010 | Watanave et al. .............. 707/781 |
| 7,765,195 B2* | 7/2010 | Miller et al. ................... 707/695 |
| 7,853,987 B2* | 12/2010 | Balasubramanian et al. .... 726/2 |
| 7,913,176 B1* | 3/2011 | Blattner et al. ................ 715/758 |
| 2002/0077803 A1* | 6/2002 | Kudoh et al. ....................... 704/1 |
| 2008/0010686 A1* | 1/2008 | Nemoto et al. .................. 726/27 |

* cited by examiner

*Primary Examiner* — David Garcia Cervetti
*Assistant Examiner* — Fikremariam A Yalew
(74) *Attorney, Agent, or Firm* — Shimokaji & Associates, P.C.

(57) ABSTRACT

An access control method performed by a network server to which a plurality of users are connected is disclosed. In the access control method, upon access from each user to data stored in a network resource, the access control method searches a plurality of access control rules prepared in advance for controlling accesses from the users and each including an access control value which is one of a finite integer number of values, by using at least one of information on the user and information on the data. Then, on the basis of the retrieved access control rule, the access control value is determined. Thereafter, response information from the data or access request information to the data is changed by using the determined access control value.

18 Claims, 13 Drawing Sheets

ATTRACTIVE Web WHICH MADE CONSTRUCTION POSSIBLE IN Ajax USING Web 2.0 TECHNOLOGY APPLICATIONS COLLECT

DISPLAY FOR MEMBERS

DISPLAY FOR NON-MEMBERS

ACCESS CONTROL WITH DECOMPOSABLE VALUES AND ITS APPLICATION FOR VIRTUAL WORLDS

BACKGROUND

The present invention relates to a technique to control access to data stored in a network resource.

Techniques of information access control are essential for preventing information usage for purposes other than the original intent. Conventionally, a rule for access control to a data file is expressed by using a set of three elements: subject, access object and operation on the object by the subject. Specifically, a relationship among the three elements means that an access subject performs a specific operation on an access object. Access control for an access request is performed according to a result of evaluating the set of three elements in the access request. Here, the evaluation result thus obtained as a value of an access control parameter (hereinafter referred to as an access control value) is a binary decision, "access granted" or "access denied." In short, the access control value is one of the values, 1 or 0.

Japanese Patent Application Publication No. 2001-184264 discloses a technique of conditional access control. This technique not only simply determines whether or not to grant access for an access request, but also grants access if a certain condition is satisfied. Moreover, by using this technique of conditional access control, when a condition to be evaluated requires satisfaction of a different condition, this different condition is also evaluated recursively.

As described above, with the conventional technique, evaluation for access control can be made with predefined conditions. However, the evaluation is made even on the conditional basis, but to the result of the evaluation is a binary decision, "access granted" or "access denied." In contrast, in fact, access to data stored in a network resource needs to be controlled by using not only the two values of the binary decisions but also an intermediate value in-between, such as 50% of access permission. For example, in some cases in a virtual world, it is desired to grant permission to see the inside of a building with 50% clarity, or to see a product at 30% of the regular size. However, such permission is not possible in the conventional access control based on a binary decision, "access granted" or "access denied."

BRIEF SUMMARY

In one embodiment of the present invention, a method for controlling access to a plurality of data objects being accessed by one or more users is disclosed. The method comprises receiving one or more requests for an access to a data object, searching a plurality of predetermined access control rules by using at least one of an information of a user requesting the access and an information associated with the data object, determining a value of an access control parameter for each of the one or more users requesting access to said data object, calculating an access control value for the data object; and modifying, for each of the one or more users requesting access to the data object, either the one or more requests or a value of the data object reported in response to the one or more requests, the modifying responsive to the access control value; wherein each of the plurality of predetermined access control rules is responsive to at least one access control parameter, and wherein the access control value is calculated based on the values of the access control parameters for each of the one or more users requesting access to said data object.

In another embodiment of the present invention, a computer program product comprising a computer readable medium including a computer program is disclosed. The computer program when executed on a computer connected to a computer network causes the computer to implement a method of controlling access data stored at a network resources ; the computer program product includes code for receiving one or more requests for an access to a data object, creating a table having one access control parameter entry for each of the one or more requests, calculating an access control value based on entries of the table; and fulfilling the one or more requests by reporting a modified value of the data object; the modified value calculated responsive to the access control value.

In yet another embodiment of the present invention, a server device for controlling access to a plurality of data objects by one or more users is disclosed. The server device comprises: a receiving unit for receiving one or more requests for an access to a data object, a search unit for searching a database for an access control rule using at least one of an information about a user and information about the data object, the database having a plurality of access control rules stored prior to receiving the one or more requests, and the access control rules each including an access control value, an access control value determination unit for determining the access control value using an access control rule retrieved the database, and an information converter for changing one of response information from the data object and the one or more access requests for the data object, the changing responsive to the access control value.

In still another embodiment of the present invention, an access control system comprising a server, an access rules database, a storage and a plurality of client terminals of users communicatively coupled with each other is disclosed, wherein the server comprises: a search unit which performs a search of the access rule database for an access control rule; the search responsive to an access control request to access a data object in the storage; a access control value determination unit for determining an access control value using an access control rule retrieved from the access rules database; and an information converter for changing one of response information from the data object and the one or more access requests for the data object; the changing responsive to the access control value; a communication unit for communicating the response information to a client terminal of the access control request; and the database comprises: a plurality of predetermined access control rules; and each of the plurality of client terminals comprises: an output converter for converting received response information into an output information.

These and other features, aspects and advantages of the present invention will become better understood with reference to the following drawings, description and claims.

DETAILED DESCRIPTION

Figure 1:
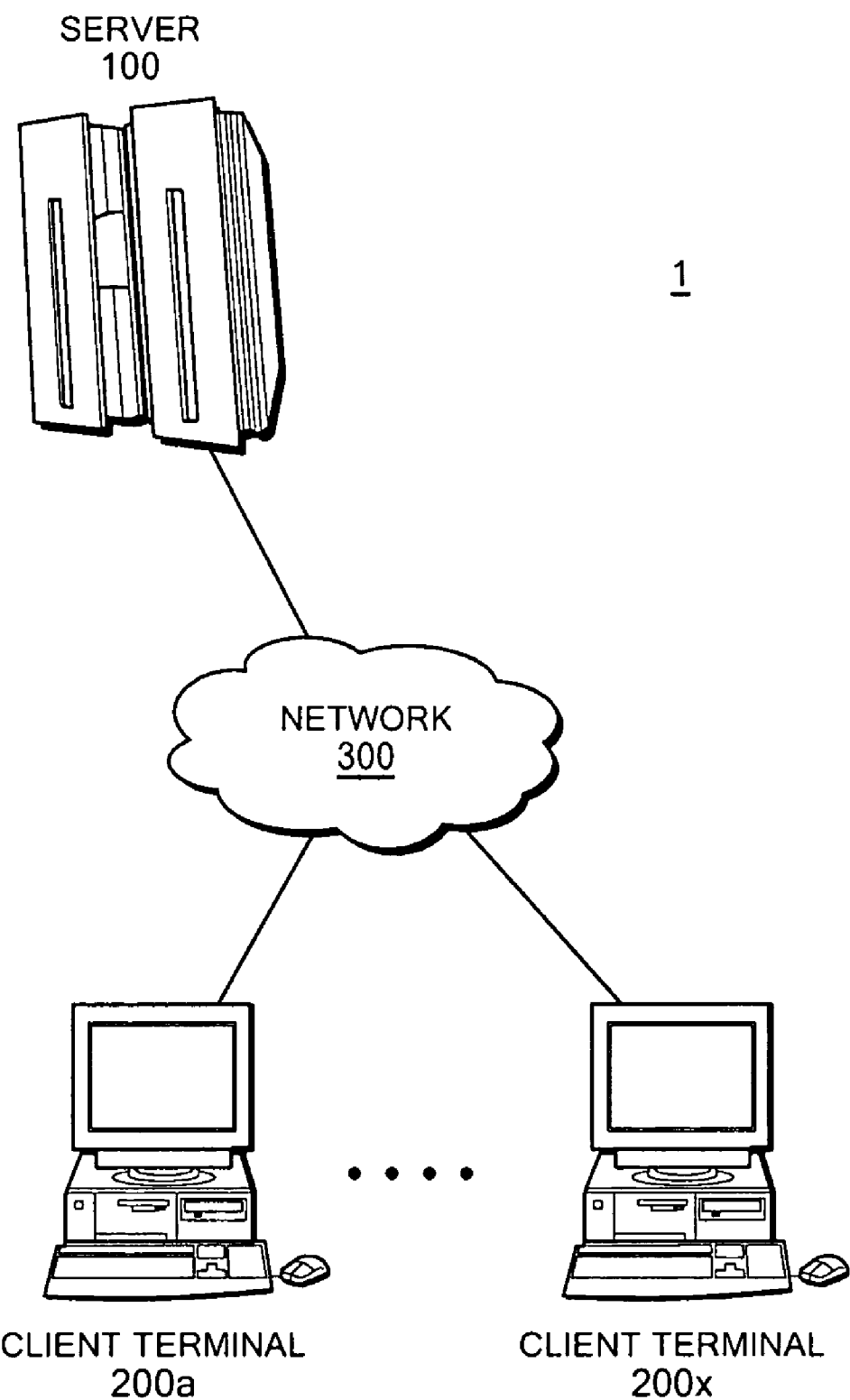
FIG. 1 is a view showing an example of the configuration of a system which implements the present invention.

In the description below, an embodiment of the present invention will be described with reference to the drawings. FIG. 1 is a view showing a configuration of an example of an access control system 1 which implements the present invention. Terminals 200a, 200b . . . 200x (hereinafter, simply referred to as client terminals since the terminal 200a to the terminal 200x do not need to be distinguished from one another) are client terminals on the user side, and are each connected to a network 300, for example, the Internet or an intranet, to be able to communicate with a server 100 (hereinafter, simply referred to as a server). By operating the client terminal 200a, the user can chat with the user of the client terminal 200x through the network 300 and the server 100, and can also access contents on the server 100, for example. It should be noted that the number of servers to be included in the above configuration is not necessarily limited to one, and that the system may be decentralized within the network.

Figure 2:
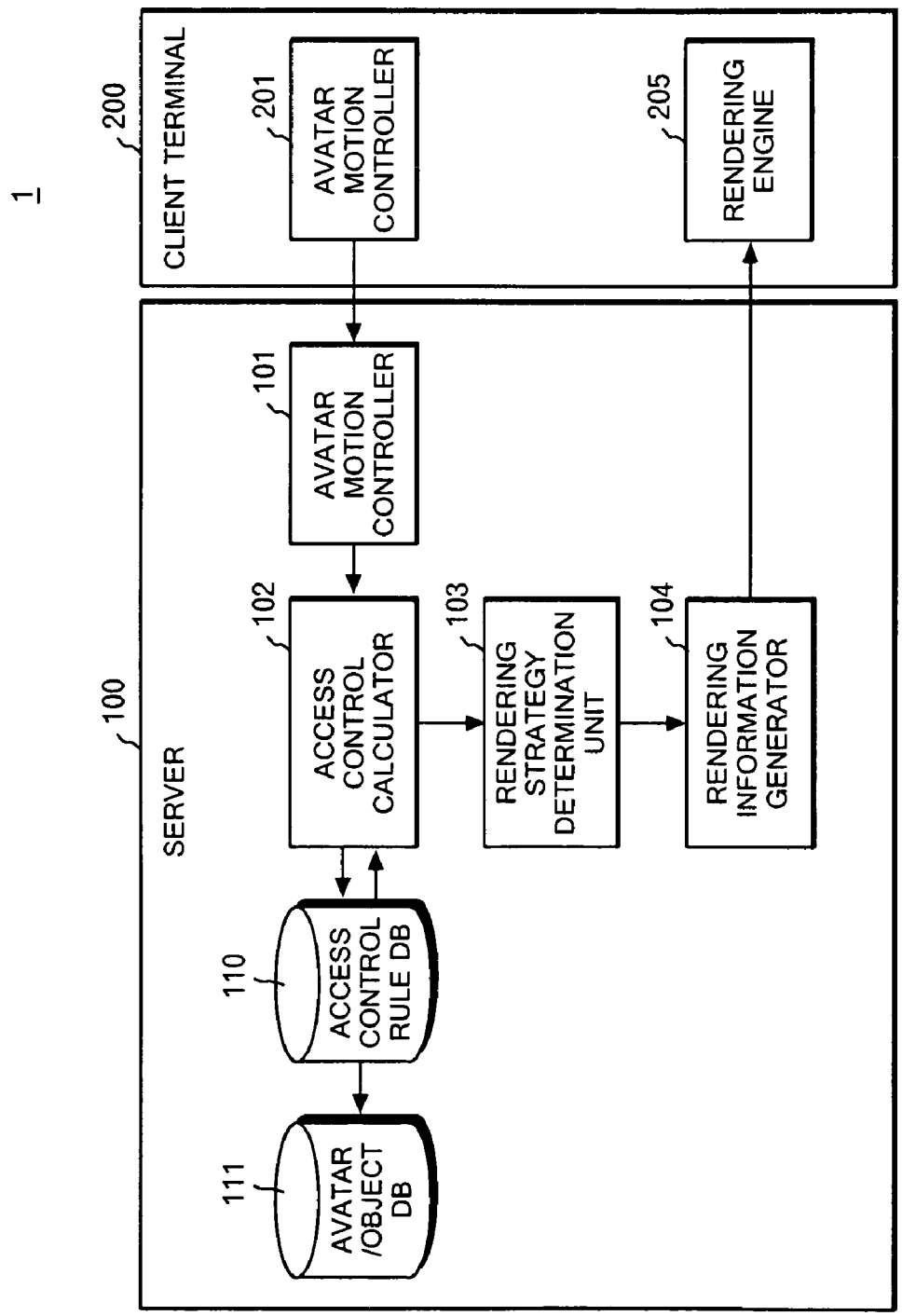
FIG. 2 is a diagram showing an exemplary system configuration of a client terminal and a server of an embodiment in which the present invention is applied to a virtual world.

An embodiment in which the present invention is applied to a virtual world will be described. FIG. 2 is a basic system configuration diagram of the client terminal and the server in the embodiment in which the present invention is applied to a virtual world. The server may include an avatar action controller 101, an access control calculator 102, a rendering strategy determination unit 103, a rendering information generator 104, an access control rule database 110 (hereinafter, database being denoted by DB), and an avatar/data object DB 111. The access control rule DB 110 may store an access control rule table and an access control value table therein. The tables may otherwise be provided independently. The client terminal may include an avatar action controller 201 and a rendering engine 205.

The avatar action controllers 101 and 201 may perform control of the movement and action of avatars. For example, assume that an avatar attempts to move to a place. Here, the avatar action controllers 101 and 201 may perform control such that the avatar cannot move to the place if another avatar is in the place. In the system 1 of this embodiment, both the server and the client may be provided respectively with the avatar action controllers 101 and 201. However, in another embodiment, the system may be configured so that a single avatar action controller is provided to one of the server and the client, or an avatar action controller is provided to each of the server and the client to divide the access control operation between the two. When the control is mainly performed by the client terminal, the load for the server can be reduced. In contrast, when the control is mainly performed by the server, the load of the client terminal can be reduced. The access control calculator 102 may obtain an access control rule, and then may calculate the access control value. The rendering strategy determination unit 103 may output a rendering result on the basis of the access control value calculated by the access control calculator 102 and the access control rule obtained by the access control calculator 102. Here, rendering is a technique to create, through calculation, an image from information on an object or a figure given as numerical data, or a technique to reproduce sound from information on sound recorded in advance, for example. The rendering information generator 104 may create rendering information to be sent to the client terminal, on the basis of the result outputted by the rendering strategy determination unit 103. The rendering engine 205 may create an image or reproduces sound from the rendering information created by the rendering information generator 104, and then, the result is outputted from an output unit (not shown) of a computer or the like of the user.

The access control calculator 102 is an example of a search unit and an access control value determination unit. The rendering strategy determination unit 103 and the rendering information generator 104 are an example of an information converter, and the rendering engine 205 is an example of an output converter. The access control rule DB 110 is an example of an access control rule storage. Here, the storage is not limited to a DB on a hard disk, and may be an external storage device such as a memory, a magnetic tape or a flexible disk. A hardware configuration of the server and the client terminal will be described later.

Figure 3:
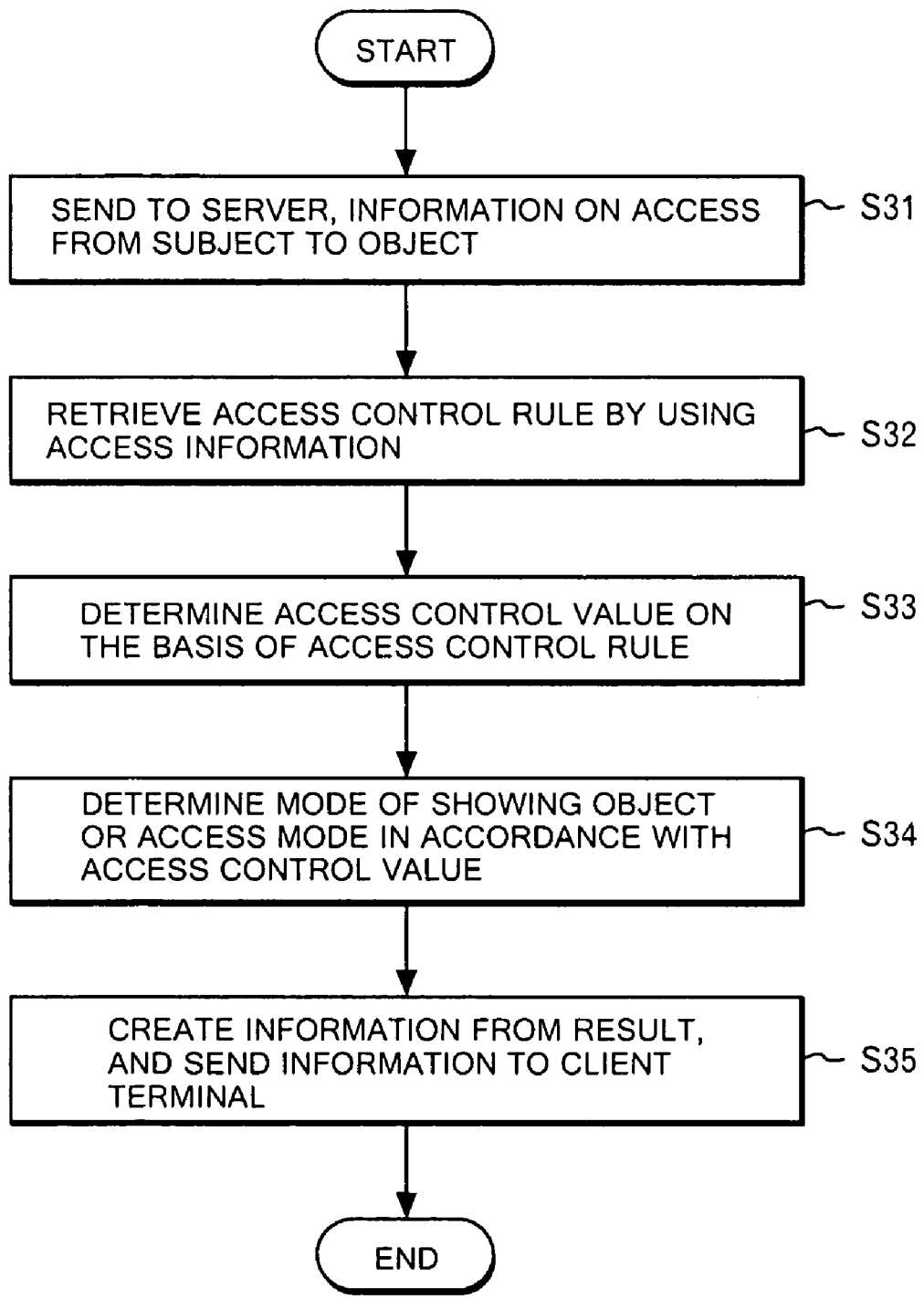
FIG. 3 is a flowchart of a process to modify a result depending on an access control value in accordance with an embodiment of the present invention.

Next, description will be given of an access control process. FIG. 3 is a flowchart of the access control process. Access control rules regarding an access subject and an access object (data object) may be defined in advance. The access control rules each including an access control value that can be equal to one of multiple values. In a virtual world, a subject may be an avatar, and access object examples include avatars, animals, buildings and places. Access control rules are described in details further in the specification. The access control process may start when a subject accesses an object. Here, the expression, to access, means that the subject performs an action on the object, for example, the subject looks at the object, or talks to the object. The information on the access from the subject to the object may be sent from the avatar action controller 201 of the client terminal to the avatar action controller 101 of the server (Step S31). The access control calculator 102 may search the access control rule table stored in the access control rule DB 110, on the basis of the received access information (Step S32). The access control calculator 102 may obtain an access control function from the rule obtained in Step S32, and then may determine the access control value by using the function (Step S33). The rendering strategy determination unit 103 may determine the mode of showing the object or the mode of access, on the basis of the access control rule obtained in Step S32 and the access control value obtained in Step S33 (Step S34). Thereafter, the rendering information generator 104 may create information from the result obtained in Step S34, and then may send the information to the client terminal (Step S35). The rendering engine 205 of the client terminal may create an image or reproduces sound from the received information, and thereafter, the result may be outputted from the output unit (not shown) of a computer or the like.

An access control rule (also referred to as ACLRULE) may be a rule that defines the access right of an access subject to an access object. In general, an access control rule may be expressed by using a set of three elements, a subject, an object and detail of permission. A value based on this set of three elements, namely, an access control value, can only be either 0 or 1, i.e. one of two values, True or False. For example, if the access control rule is <S1, O1, readable>, it means that a subject S1 (a user, for example) is allowed to read (readable) an object (a directory, for example). Since the access control value can only be either 0 or 1, this access control is to allow the subject to read the object completely, or to not allow the subject to read the object at all.

An access control rule of this embodiment according to the present invention may be the same as the above-mentioned access control rule in that the access right of an access subject to an object is defined therein. However, the access control rule of this embodiment may be different in that the access object of the access control can be an area defined in the rule, and that access control values can be one of multiple values each being, for example, a decimal value between 0 and 1 or a value not smaller than 1. Moreover, since the access control values can be one of multiple values, an access control value can be divided. Accordingly, the access control rule of this embodiment according to the present invention may consist of a set of seven elements, which are the positions of the two points (P1 and P2) that define the area to be the access control target, a flag showing whether or not the access control value is dividable (DividableP), and an access control value, in addition to a subject, an access object and detail of permission. Since the access control value can be a function, instead of a numerical value, for determining an access control value on the basis of an access condition or the like, the access control value is termed as access control function (ACL_func) in the access control rule.

Description will be given below of the seven categories in the access control rule.

| | |
|---|---|
| 1) P1 | : defining access control object area together with P2 |
| 2) P2 | : defining access control object area together with P1 |
| 3) Subj | : subject of access control |
| 4) Obj | : object of access control |
| 5) Action rule | : detail of permission granted by access control |
| 6) ACL_func | : access control function |
| 7) DividableP | : flag showing whether or not access control value is dividable |

An identifier, such as an object ID indicating a two-dimensional object or a three-dimensional object, may be registered for each of Subj and Obj. Moreover, operations such as read, write, and see, as well as a method for modifying response information from the access object or access request information to the access object may be registered as Action. Here, the method for modifying response information from the access object or access request information to the access object is specifically a method of changing the size of the object the avatar is looking at, or of changing the access speed of the avatar to the object. Detailed description of this method will be given later. As ACL_func, an access control function or a numerical value is registered, both of which return an access control value being one of multiple values, as a result. In ACL_func, the value 1 denotes that access is granted, and the value 0 denotes that access is denied, as in the conventional access control. When the access control value is a numerical value not smaller than 1, access may be permitted as in the case of the value 1.

In P1 and P2, information on the area to be the access control object may be defined. The area information may be represented by coordinates or a vector, for example. In the case of using coordinates, (x,y) coordinates may be used when the area is a two-dimensional space, and (x, y, z) coordinates may be used when the area is a three-dimensional space. By including information on the area to be the access control object, the access control rule can be defined not only for each object, but also for each area. This is for a case where different types of control are required even for one object. For example, one may need to perform control in a building as an object such that everyone can enter the first floor while only the owner can enter the second floor. Moreover, the area to be the access control object can be defined also in an area that is different from where the subject is, and also from where the access object is. To define an access control rule that is independent of an area, such as an access control rule for a subject simply to access an object, a particular value may be entered in P1 and P2 for the indication.

The access control rule may be stored in the access control rule table in the access control rule DB 110. Main categories of the access control rule table may be the seven categories of the access control rule and an access control identification (ID). A configuration of the access control rule table will be shown below when the area to be the access control object is a three-dimensional space.

[Access Control Rule DB 110]
(Access Control Rule Table)
subject
object
X coordinate 1
Y coordinate 1
Z coordinate 1
X coordinate 2
Y coordinate 2
Z coordinate 2
detail of permission granted by access control rule·access control function
division flag
avatar control ID Additionally, it is also possible to include a category for access control upper limit for the access object. Here, access control upper limit means the upper limit of the sum of access control values for the object avatar. Similarly, a category for access control upper limit for an object can be included in an object table. This will be described in detail later.

Figure 4:
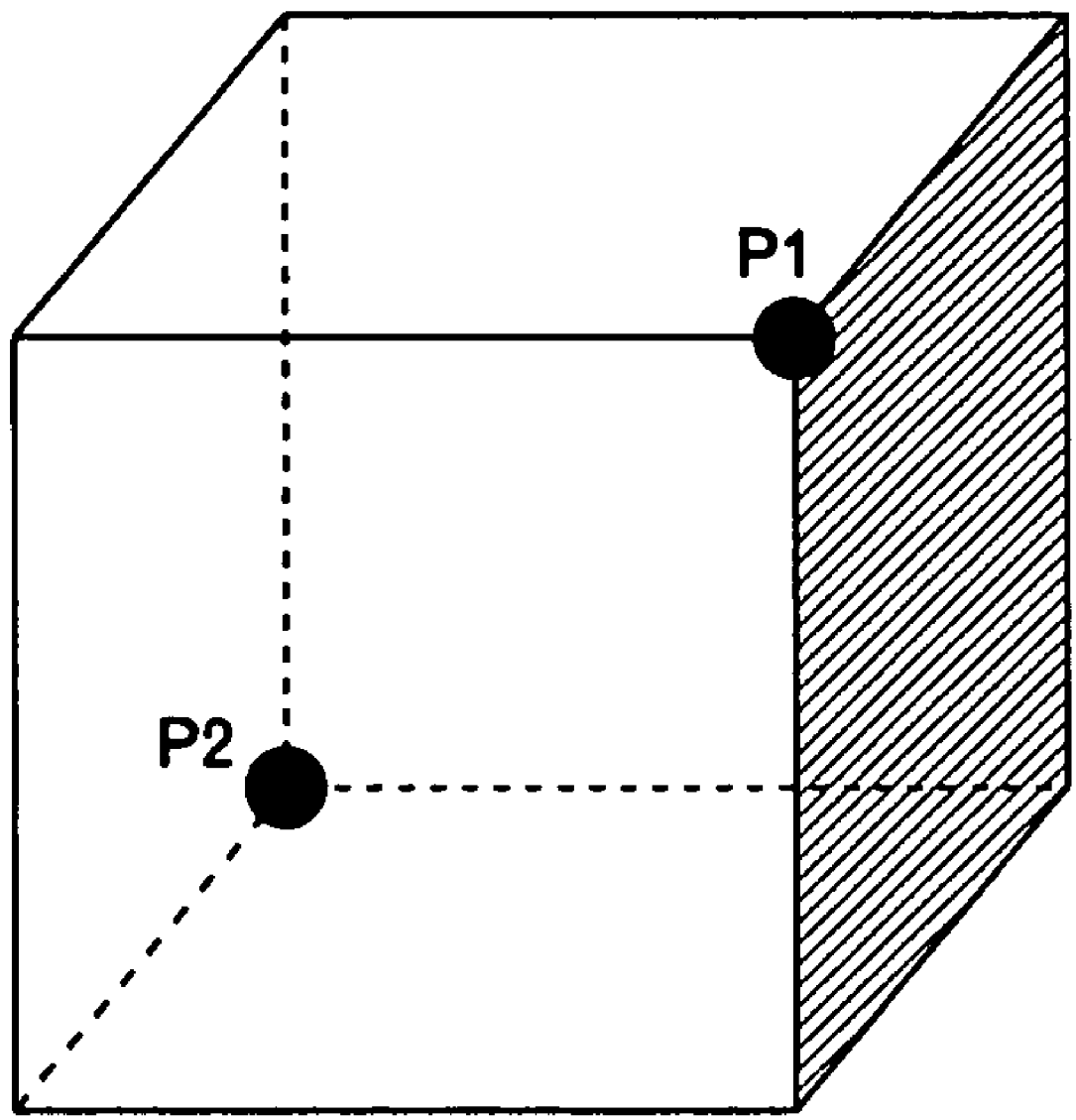
FIG. 4 is a view showing a rectangular parallelepiped defined by two points P1 and P2 in accordance with an embodiment of the present invention.

In one embodiment, the coordinates of P1 are represented as (X coordinate 1, Y coordinate 1, Z coordinate 1), and the coordinates of P2 are represented as (X coordinate 2, Y coordinate 2, Z coordinate 2). The area to be the access control object may be a rectangular parallelepiped that is defined by the two points P1 and P2. FIG. 4 is a view showing the rectangular parallelepiped defined by the two points P1 and P2. If a point within this rectangular parallelepiped space is represented as (x, y, z), the following inequalities are satisfied: X coordinate $2<x<X$ coordinate 1, Y coordinate $2<y<Y$ coordinate 1, and Z coordinate $2<z<Z$ coordinate 1. As to the relationship among a subject, an access object and a rectangular parallelepiped space, there are four cases, 1) when the subject is in the space, 2) when the object is in the space, 3) when both the subject and the object are in the space, and 4) when both the subject and the object are outside the space.

Next, description will be given of division flag in the access control rule table, that is, DividableP of the access control rule. DividableP is a flag that may indicate whether or not the access control value is dividable. If the flag is "Yes," the access control value of the subject avatar can be explicitly divided, so that a resultant value can be assigned to another avatar, in the course of the action of the subject avatar. The avatar control ID may be included so as to associate the access control rule table with the access control value table of the access control rule DB 110 to be described later. In the category for subject in the access control rule table, an avatar ID or the group ID of the avatar, or an access object ID or the group ID of the access object, may be registered. The same may also be applicable to the category for access object in the access control rule table. These IDs will be collectively called an identifier, below.

An avatar/object DB 111 may include avatar IDs and the group IDs of the avatar IDs, and access object IDs and the group IDs of the access object IDs. The avatar/object DB 111 may include the group IDs because access control rules are sometimes defined for groups, instead of a particular subject or access object. However, the avatar IDs and the object IDs may not always have their group ID. A group ID is an ID given for categories such as users in their twenties or in their thirties. Typical categories included in the avatar/object DB 111 will be shown below.

[Avatar/ObjectDB 111]
(Avatar table)
avatar ID
group ID
(Object table)
object ID
group ID For the access control rule retrieval in Step S32 in FIG. 3, a structured query language (SQL) expression is used. As a retrieval condition, at least one of user information and information on data that may be stored by the network resource may be used. In this embodiment, the user information shows the identifier of the avatar or location information of the avatar, and the data information shows the identifier of an object or an avatar, or location information of the object or the avatar. By issuing an SQL expression to the access control rule table of the access control rule DB 110 and to the avatar/object DB 111, an access control rule can be obtained. High speed search is possible by using identifiers to represent the subject and the object while using coordinates to represent the space. For example, when an avatar a is located at coordinates (x ,y, z), the following SQL expression may be issued to retrieve the access control rule for the coordinates (x ,y, z) of the avatar a.

[SQL1]
SELECT ALL FROM USER TABLE, AVATAR ACCESS CONTROL TABLE
  WHERE AVATAR ID='a' AND
    SUBJECT=GROUP ID AND
    X COORDINATE $1<x$ AND $x<X$ COORDINATE 2 AND
    Y COORDINATE $1<y$ AND $y<Y$ COORDINATE 2 AND
    Z COORDINATE $1<z$ AND $z<Z$ COORDINATE 2

As a result, a set of access control rules for the space including the spatial location (x, y, z) at which the avatar a is located may be efficiently obtained.

There may be three patterns for the access control value determination in Step S33 in FIG. 3. The first pattern may be a case in which the access control function in the access control rule is a mathematical expression. In such a case, the expression may be calculated, and the obtained value may be set as the access control value. Here, if the access control function is a number, the value may be set as the access control value. The second pattern may be a case in which the access control value is assigned and enjoyed between avatars, that is, the access control value is divided, combined, and handed over. The division flag needs to be Yes to perform division of the access control value.

Figure 5:
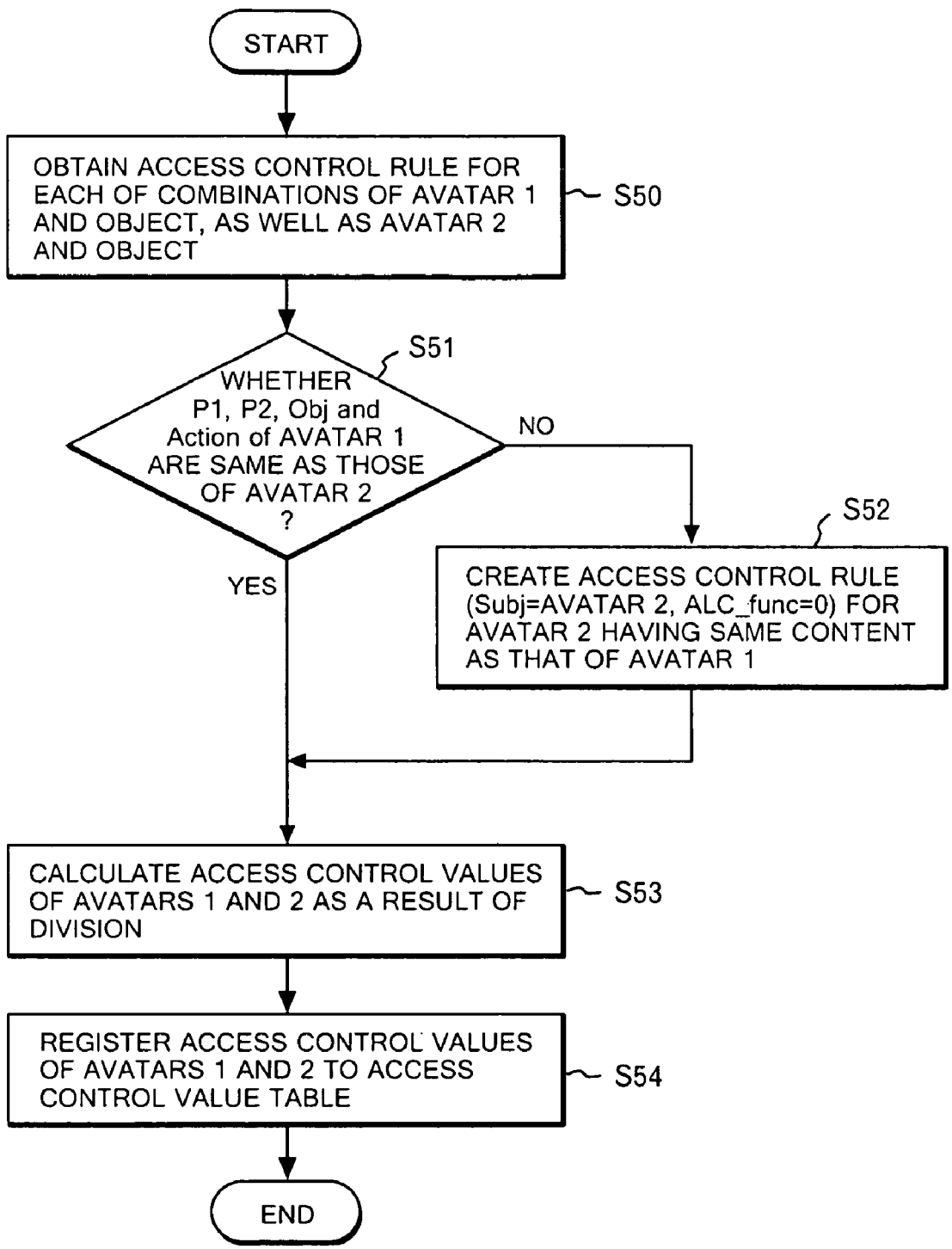
FIG. 5 is a flow chart showing a division process flow in accordance with an embodiment of the present invention.

Next, a division process flow will be described by taking, as an example, the case in which an avatar 1 divides the access control value and then assigns a resultant value to an avatar 2 when the adjacent avatars 1 and 2 are to access an access object. FIG. 5 is a flowchart showing the division process flow. Firstly, when an instruction to divide the access control value and to then assign a resultant value to the avatar 2 is given from the user of the avatar 1 by using an input unit such as a keyboard, an SQL expression using the identifiers of the avatar 1 and the access object, as well as an SQL expression using identifiers of the avatar 2 and the access object may be issued to the access control rule table of the access control rule DB 110 and to the avatar/object DB 111. Thereafter, access control rules each satisfying one of the conditions may be obtained (Step S50). Then, judgment may be made as to whether P1, P2, Obj and Action in the obtained access control rule for the avatar 1 are consistent with those in the obtained access control rule for the avatar 2 (Step S51). If it is judged that they are inconsistent with each other, an access control rule that has the same content as that for the avatar 1 may be created for the access control rule for the avatar 2 in the access control rule table of the access control rule DB 110 (Step S52). In the created access control rule, the subject may be set to be avatar 2, and the access value function may be set to be 0. Then, if it is judged that they are consistent with each other, the access control values as a result of the division may be calculated, or if it is judged that they are inconsistent with each other, the access control values as a result of the division may be calculated after the access control rule is newly created (Step S53). The way to divide the access control value may be determined by the user of the avatar 1, who originally gives the instruction to perform the division. The access control values of the avatar 1 and the avatar 2 newly obtained in Step S53 may be registered in the access control value table of the access control rule DB 110. Main categories included in the access control value table are shown below. The access control value table may be created in a case where the access control value is to be divided, combined and handed over, or in a case, to be described next, where a single access control value is used as a representative value when a plurality of avatars access the same access object.

[Access Control Rule DB 110]
(Access control value table)
avatar ID
access control value
access control ID An access control ID may be used to associate information in the original access control rule table with information in the newly created access control value table. A value set for an access control ID is arbitrary, and can be, for example, the sequence number at which the access control value is created. When the access control value table is created, the original access control ID of the access control rule may be updated. By using the access control value in the access control value table thus created, the response information from the access object or the access request information to the access object may be modified. Similarly, in the case where the access control value is combined, a new access control value may be registered in the access control value table.

The third pattern is a case where a single access control value is used as the representative value when a plurality of avatars access the same access object. The maximum value, the minimum value, or the average value, of the access control values of the plurality of avatars may be used as the representative value, for example. An SQL expression for obtaining an access control value to be the representative value when a plurality of avatars are looking at the avatar b is shown below. Here, the representative value may be the average value of the access control values of the plurality of avatars. The access control object may be a space including the space location (x, y, z) at which the avatar b is located.

[SQL2]
SELECT AVG (access value) FROM AVATAR TABLE, AVATAR ACCESS CONTROL TABLE
WHERE AVATAR ID='b' AND
X COORDINATE 1<x AND x<X COORDINATE 2 AND
Y COORDINATE 1<y AND y<Y COORDINATE 2 AND
Z COORDINATE 1<z AND z<Z COORDINATE 2

The representative value obtained by the above SQL expression may be registered for each of the avatars in the access control value table, and the access result of each of the avatars may be changed by using the representative value.

Next, access control upper limit for objects and avatars will be described. The access control upper limit is defined in the access control value table of the access control rule DB 110. For example, if the access control upper limit is set to be 100 for an object, 100 avatars can access the object at the maximum. As mentioned above, an access control value can be divided, combined and handed over. Assume that an avatar A has the access control value of 0. In this case, the access control value of the avatar A may become 1 by obtaining the access control value of 0.3 from an avatar B and the access control value of 0.7 from an avatar B, so that the avatar A can access the access object. Moreover, the access control value of the avatar A may become 100 by obtaining the access control values from all the other avatars having the access control value for the access object, so that only the avatar A can access the object. In this manner, access restriction can be performed.

Next, methods of modifying response information from the access object and access request information to the access object will be described. There are mainly two kinds of methods: one is to change information as continuous information without any conversion by using the access control value as an increase/decrease factor; and the other is to change information through conversion into discrete information by using the access control value as a discrete factor. The method of changing information as continuous information without any conversion by using the access control value as an increase/decrease factor, may be that, when the access control value to a certain avatar is 0.6, the increase/decrease factor may be 60%, so that the size of the certain avatar is reduced to 60% of its regular size, for example. In contrast, the method of changing information through conversion into discrete information by using the access control value as a discrete factor, may be that, when the access control value to a space in which a plurality of exhibits are displayed is 0.6, the discrete factor is 60%, so that 60% of the exhibits in the space can be seen, for example.

Figure 6:
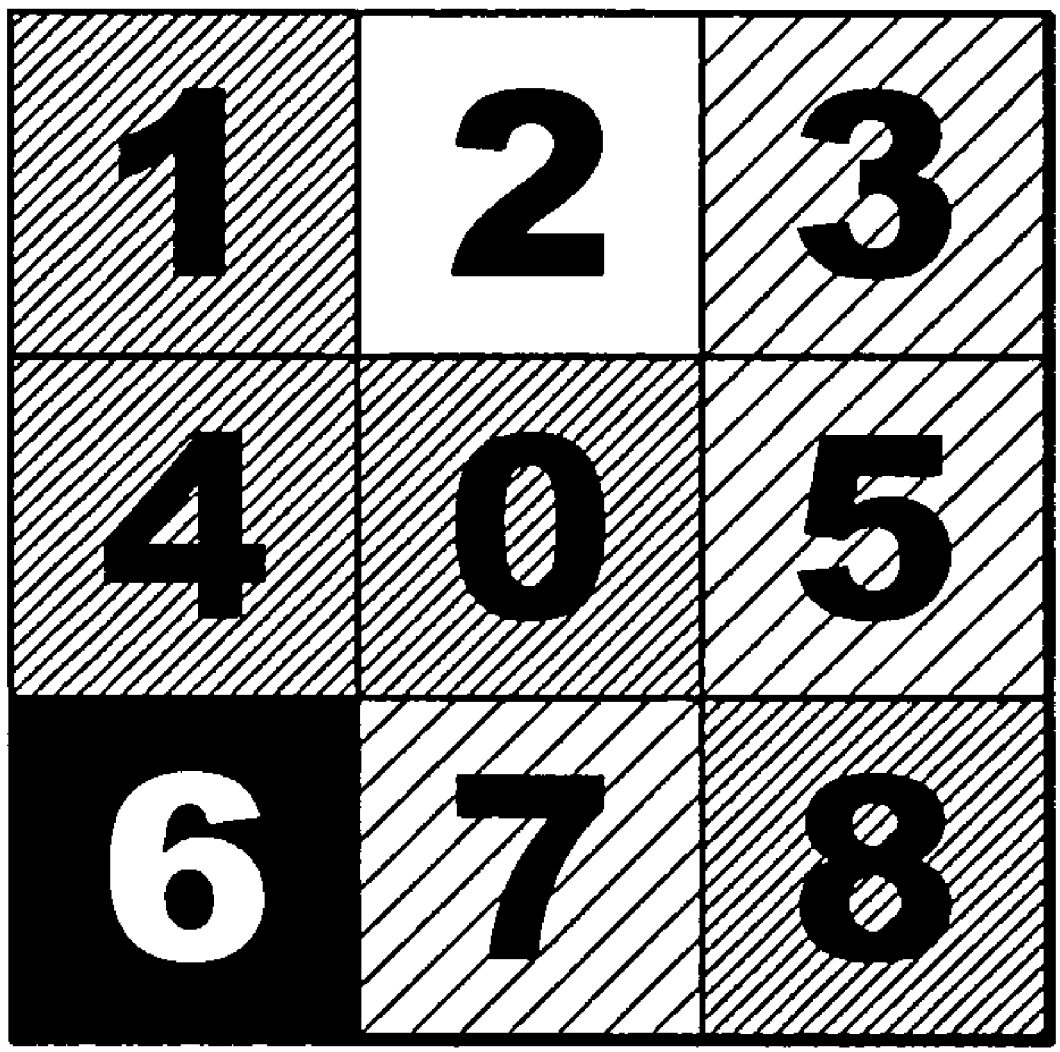
FIG. 6 is a view showing relationship between a pixel and other pixels around the pixel in accordance with an embodiment of the present invention.

Description will be given below of concrete methods of changing information as continuous information without any conversion by using the access control value as an increase/decrease factor. One such method is to make the entire access object appear blurred in accordance with the access control value. This method may be used for such case in which the access object can be seen with 70% clarity when the access control value is 0.7, for example. Specifically, the average of pixel values of pixels around a certain pixel on a display may be obtained, and then, the pixel value of the certain pixel may be replaced with the average value. FIG. 6 is a view showing the relationship between the certain pixel and the pixels around the certain pixel. Assume that the pixel values of the cells 0, 1, . . . , 8 in FIG. 6 are denoted by p0, p1, . . . , p8, respectively. In this case, a new value q0 of the p0 can be obtained by use of Expression (4) below.

[Formula 1]

$$q0 = a \times \mathrm{avg}(p1, p2, \ldots, p8) \qquad (4)$$

In Expression (4), a is a normalization variable, and may be a variable that varies in accordance with the clarity. With this method, by using a mosaic display, the communication traffic between the client terminal and the server can be reduced.

Another such method may be to change the display size or color of the access object in accordance with the access control value. This method may be used for a case in which the display size of the access object is reduced to 70% of its regular size when the access control value is 0.7. Specifically, the access object may be reduced in size in accordance with the access control value. In addition, it is also possible to perform a process to change the display to black-and-white, for example. These methods may also be effective in reducing the communication traffic, as with the method of making the entire access object appear blurred.

Description will be given below of a concrete method of changing information through conversion to discrete information by using the access control value as a discrete factor. One such method is to increase or decrease the object amount of the access object to be displayed. For example, this method may be used for a case in which a portion corresponding to 70% of the access object can be seen when the access control value is 0.7. Specifically, the information on the objects to be placed in the space may be rewritten, and then, the resultant information may be sent from the server to the client terminal. Since the number of the objects to be shown is reduced, the communication traffic and the load in a client process can be reduced in accordance with the reduced display amount. All of the three methods described above are for changing response information from the access object.

Next, description will be given of a method for changing access request information to the access object. One such method may be to restrict the action of the avatar accessing an access object. For example, this method may be used for a case in which the walking pace of the avatar is reduced to 70% of the regular pace, when the access control value is 0.7. Specifically, action speed can be slowed down by adding delay time to the unit action. As a result, time required for accessing the object may be made longer.

EXAMPLE 1

This embodiment of the present invention that can set an access control rule for each area will be described below in more detail by use of a first example.

<Rules Set Differently in Object on which Access Control is to be Performed>

Figure 7:
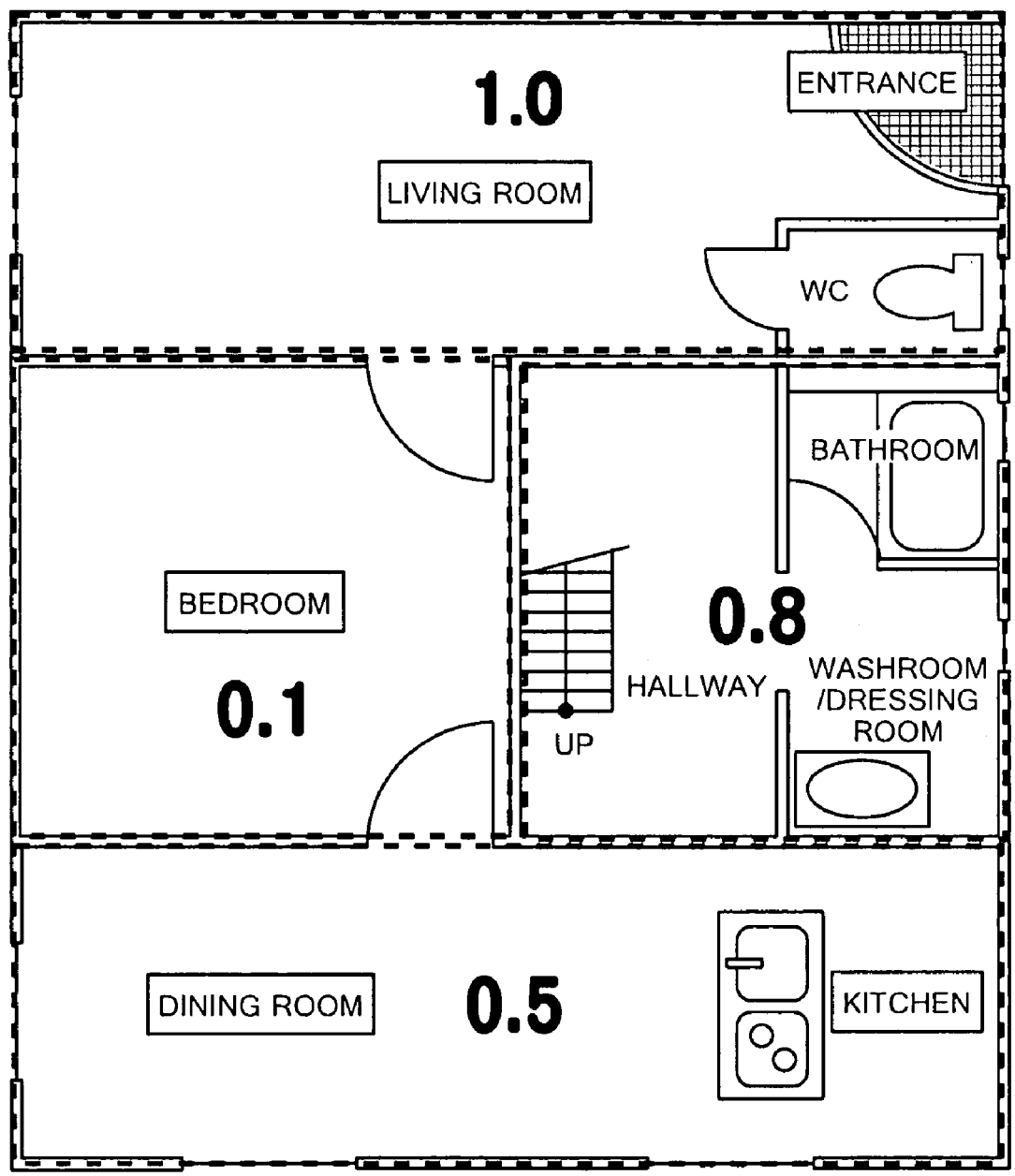
FIG. 7 is a view showing a floor plan of a building in a virtual world in accordance with an embodiment of the present invention.

FIG. 7 is a view showing a floor plan of a building in a virtual world. Described is a case of setting a different access control rule for each room for visitor avatars in a building in a virtual world with reference to FIG. 7. An access control rule to be set for the living room in the above scenario may be as shown below. Since division and the like of the access control value are not performed here, DividableP and the avatar control ID are omitted in the rule shown below.

```
1) P1         : (x1, y1, z1)
2) P2         : (x2, y2, z2)
3) Subj       : visitor avatars
4) Obj        : building
5) Action     : see, make object appear blurred
6) ACL_fync   : 1.0
```

In the above, the coordinate points P1 and P2 define the living room space. Similarly, access control rules are registered for the hallway and the like, the dining-kitchen, and the bed room, respectively. As shown above, ACL_func for the living room is 1.0, and hence, a visitor avatar can see the living room with 100% clarity. In contrast, as shown in FIG. 7, ACL_func for the hallway and the like, ACL_func for the dining-kitchen, and ACL_func for the bed room are 0.8, 0.5, and 0.1, respectively. Accordingly, the visitor avatar can see the hallway and the like, the dining room with a kitchen, and the bed room, only with 80% clarity, 50% clarity, and 10% clarity, respectively. By setting access control rules as described above, it is possible to perform access control to show the living room completely, to show the bedroom to an extent that a visitor avatar can recognize whether or not there is a person while avoiding to show any further, and to show the dining-kitchen at an intermediate extent between the above two.

EXAMPLE 2

This embodiment of the present invention will be described below further in detail with reference to the cases using three different access control functions.

<Function for Attenuation According to Distance>

Figures 8, 9:
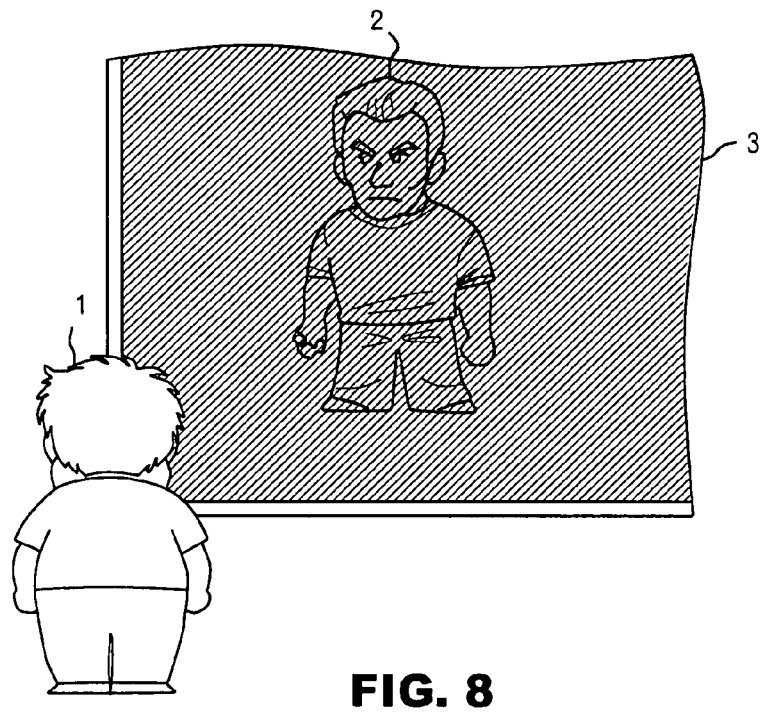
FIG. 8 is a view showing access control performed in a state where an avatar 1 looks at an avatar 2 in a virtual world in accordance with an embodiment of the present invention.
FIG. 9 shows a result obtained by applying, to a document on the Internet, a function that generates a random value in accordance with an embodiment of the present invention.

As an example of the access control function, a function for attenuation according to the distance will be described with reference to FIG. 8. FIG. 8 is a view showing access control performed in a state where the avatar 1 is looking at the avatar 2 in a virtual world. The avatar 2 is located in a space defined by the coordinate points P1 and P2, and this space is set as the area to be the access control object. The location of the avatar 1 is defined by the coordinates (x, y, z). In this scenario, the access control rule is registered as shown below. Here, division and the like of the access control value are not performed, and hence, DividableP and avatar control ID are omitted in the access control rule shown below.

```
1) P1         :(x1, y1, z1)
2) P2         :(x2, y2, z2)
3) Subj       :avatar 1
4) Obj        :avatar 2
5) Action     :see, make object appear blurred
6) ACL_func   :Expression (1)
```
(1)

[Formula 2]
$$ACL\_FUNC1 = \frac{1}{\sqrt{(Px' - P1x)^2 + (Py' - P1y)^2 + (Pz' - P1z)^2}}$$
$$Px' = \frac{P1x + P2x}{2} \quad Py' = \frac{P1y + P2y}{2} \quad Pz' = \frac{P1z + P2z}{2}$$

The access control value ACL_func can be obtained by assigning the coordinates of P1 and P2 to ACL_func1 as shown in Expression (2) below.

[Formula 3]
$$ACL\_FUNC1 = \frac{1}{\sqrt{(x' - x)^2 + (y' - y)^2 + (z' - z)^2}} \quad (2)$$
$$x' = \frac{x1 + x2}{2} \quad y' = \frac{y1 + y2}{2} \quad z' = \frac{z1 + z2}{2}$$

In this example, the value of ACL_func, that is, the access control value, indicates the clarity when the avatar 1 sees (Action: see) the avatar 2. When the access control value is 0.5, it means that the avatar 1 may see the avatar 2 with 50% clarity. In this example, this view of the avatar 2 from the avatar 1 with 50% clarity is obtained by use of the technique to make the space in which the avatar 2 locates appear blurred. In other words, the access control value indicates the clarity of the space. The access control value in this example is in inverse proportion to the distance. Accordingly, the longer the distance from the avatar 1 to the space defined by the coordinate points P1 and P2 becomes, the less the clarity of the area becomes. It should be noted that since the access control value is to take a value from 0 to 1, the access control value is considered as 1 when taking a value equal to or larger than 1.

<Function for Generating a Random Value>

As the second example of the access control function, a function for generating a random value will be described. A function for generating a random value is a function that generates a random value from 0 to 1 as the access control value for each of the locations in the area defined in the access control rule. For example, if a function for producing a random value is applied to a document on the Internet, the access control rule is defined as follows. Here, division and the like of the access control value are not performed, and hence, DividableP and avatar control ID are omitted in the access control rule shown below.

```
1) P1         : (x1, y1, z1)                              (3)
2) P2         : (x2, y2, z2)
3) Subj       : all users
4) Obj        : document
5) Action     : see, vary access object in color strength
6) ACL_func   : Expression (3)
   [Formula 4]
   ACL_FUNC2 = rand(0, 1)
```

FIG. 9 shows a result of applying the function for producing a random value to a document on the Internet. By applying this function, a different access control value can be produced for each of the letters contained in the document. Specifically, relative to the color strength of a letter having 1 as the access control value, the color strength of a letter having 0.5 as the access control value is 50% of the reference, and the color strength of a letter having 0 as the access control value is 0% of the reference, in other words, the letter is invisible. By thus applying this function to a document to vary the letters in color strength, it is also possible to automatically create a summary of the document. Application of this function is not limited to contents on the web. This function can also be used for access control in a virtual world, such as for a notice board and the like in a virtual world. Another use of this function is in performing access control to allow or to not allow a subject avatar to see the access object depending on the angle from which the subject avatar sees the access object in a virtual world.

<Access Control Function Determined Relative to Environment in which Avatar Locates>

As the third example of the access control function, an access control function that is determined relative to the environment in which the avatar locates will be described. An access control function determined relative to the environment in which the avatar locates in a virtual world is a function that adds the access control values of the avatars that satisfy a certain condition, and thereby setting the resultant value as the access control value of the avatar. For example, an avatar a can use, as the access control value, the sum of the access control values given to the avatars located within a radius of 10 m from the avatar a (normalizing the value of the sum to 1 if the sum is larger than 1). Assume that there is an amusement park which avatars can enter only if there are more than five avatars, in a virtual world. The access control rule that is defined when each avatar is assigned 0.2 as the access control value in the above scenario is as shown below. Here, division and the like of the access control value may not be performed, and hence, DividableP and avatar control ID are omitted in the access control rule shown below.

| 1) P1 | :(x1, y1, z1) |
|---|---|
| 2) P2 | :(x2, y2, z2) |
| 3) Subj | :all avatars |
| 4) Obj | :amusement park |
| 5) Action | :enter |
| 6) ACL_func | :Expression (4) |

(4)

[Formula 5]

$$ACL\_FUNC3 = 0.2 + \sum_{i=1}^{n} a_i$$

where $a_i$ denotes the access control values of the other avatars, and n denotes the number of avatars.

The coordinates P1 and P2 define the space of the amusement park. ACL_func is a function that adds the access control values of the avatars satisfying a certain condition to the access value of the subject avatar. The certain condition can be, for example, avatars holding hands with each other, or avatars talking to each other. When there are five avatars satisfying such a condition and the access control values of the avatars are added up to 1.0, the avatars can enter the amusement park. Hence, use of this function may allow control of the avatars such that the avatars may access the access object only when a plurality of avatars are gathered together.

By combining characteristics of this embodiment of the present invention, that is, the access control functions, division and handover of the access control value, use of location as the access object, the techniques for access to the access object, and the ways to show the access object, specific examples shown below are feasible, for example.

EXAMPLE 3

Specific examples 1 to 5 in which the present invention is applied to a virtual space will be described below.

SPECIFIC EXAMPLE 1

In a building in a virtual world, by setting the access control value of a public room at 1, access can be controlled so that everyone can enter the room while not being allowed to enter any other part of the building. It is also possible to perform control to make the other rooms appear blurred according to the clarity thereof, so that the subject can see the inside of the other rooms. Here, the clarity of each room may be determined on the basis of the access control rule. This can be useful in a case where the subject checks the content before buying a product or service, since the service/product provider is not required to create a sample version of the service or the product every time.

SPECIFIC EXAMPLE 2

Figure 10:
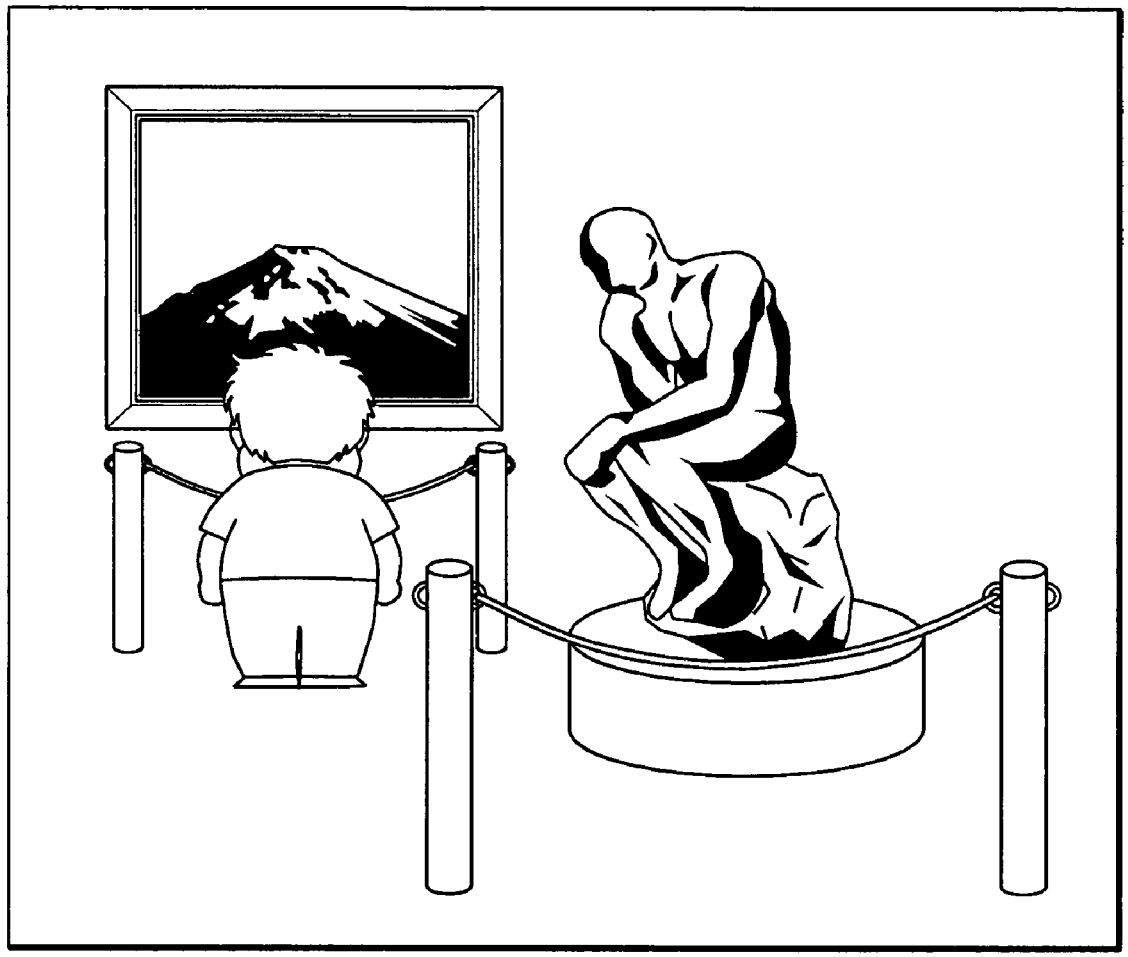
FIG. 10 is a view showing the inside of a museum seen by a paid visitor in accordance with an embodiment of the present invention.
Figure 11:
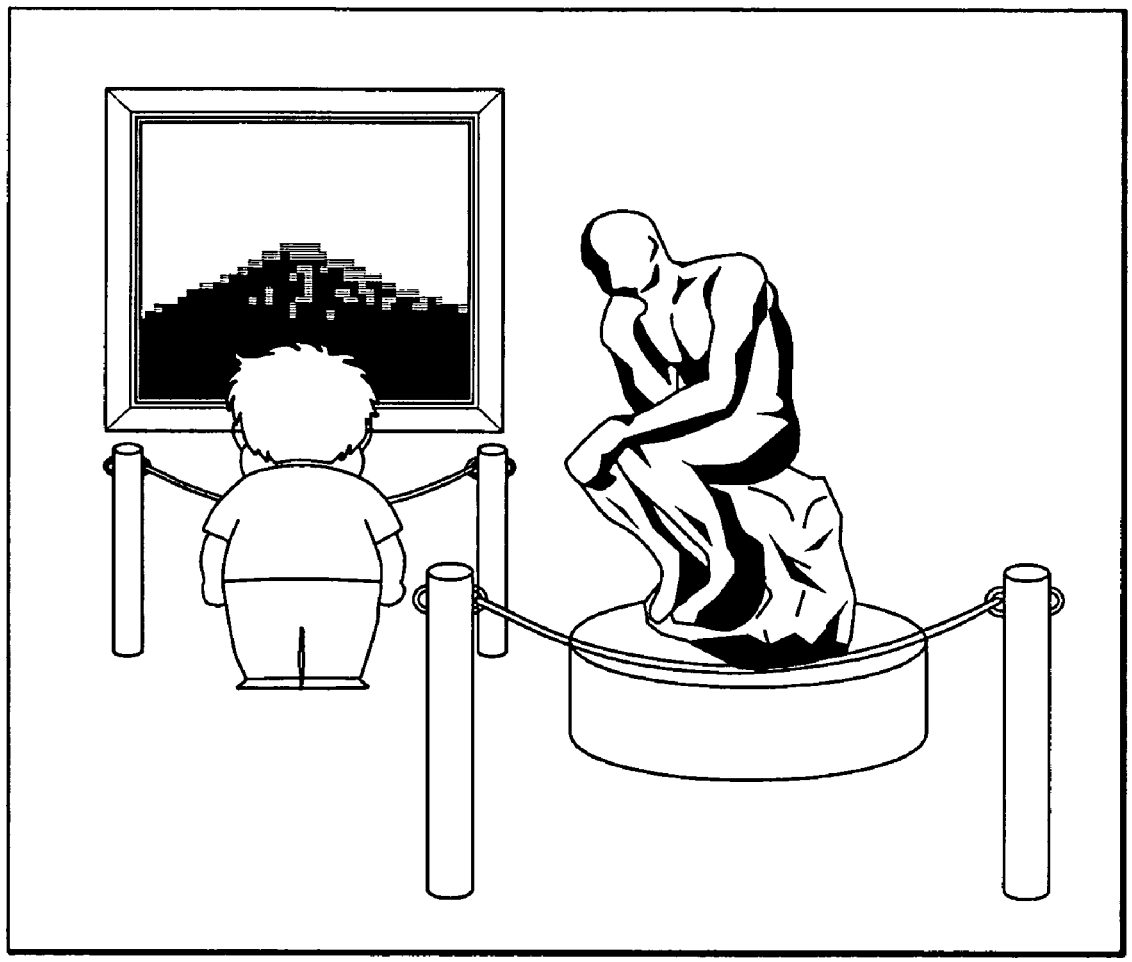
FIG. 11 is a view showing the inside of the museum of FIG. 10 seen by a free visitor in accordance with an embodiment of the present invention.

In a museum in a virtual world, access can be controlled so that visitor avatars having paid the fee (referred to as paying visitor avatars below) can have the access right to all the exhibits while other avatars (referred to as free visitor avatars below) can have the access right only to a part of the exhibits. The number of exhibits an avatar can see is determined in accordance with the access control value. When the access control value is 0.7, the avatar can see 70% of the exhibits. Such control makes it possible to allow paying visitor avatars to see all the exhibits while allowing free visitor avatars to see only part of the exhibits. FIG. 10 is a view showing the inside of the museum seen by a paying visitor avatar, and FIG. 11 is a view showing the inside of the museum seen by a free visitor avatar. As shown in FIG. 10 and FIG. 11, paying visitor avatars can see all the exhibits, but free visitor avatars can see only part of the exhibits. In addition, besides control to show or not show exhibits, control may otherwise be performed to make exhibits appear blurred according to the clarity determined on the basis of the access control value, as in the case of [Specific example 1] described above.

SPECIFIC EXAMPLE 3

When a shop assistant avatar of a virtual shop talks to a customer avatar, access can be controlled so that the voice (chat) can be heard in 1 m square, but cannot be heard outside the 1 m square. Moreover, by using a function for attenuation according to the distance, it may also be possible to perform control such that the farther away from the shop assistant avatar the customer avatar moves, the smaller the voice of the shop assistant avatar perceptible by the customer avatar becomes.

SPECIFIC EXAMPLE 4

Assume that there are avatars having the access rights of 0, 1.2 and 1.8, respectively, when only avatars having the access right of 1 or higher can enter an event site in a virtual world. In the above scenario, the avatar having the access right of 0 cannot enter the event site. However, the avatar having the access right of 0 can increase the access right to 1 by obtaining the access right of 0.2 and the access right of 0.8 assigned respectively from the other avatars. Consequently, all the three avatars have the access right of 1.0, and hence can enter the event site. Thus, although not having the access right originally, the avatar can enter the event site by obtaining access right from others of the party through division of the access rights of the other avatars.

SPECIFIC EXAMPLE 5

Assume that an event provider of a virtual world sets access rights for a predetermined number of avatars, for example, for 1000 avatars, and then distributes the access rights to avatars. Here, avatars may give the obtained access right to another avatar. The avatars each having the access right can join the event. A single avatar may have more than one access right. In this manner, the access rights can be used as tickets of the actual world. With such control, it may be possible to accurately estimate the maximum number of event participants (to provide accurate capacity planning), since the maximum number of access rights is predetermined.

EXAMPLE 4

Figure 12:
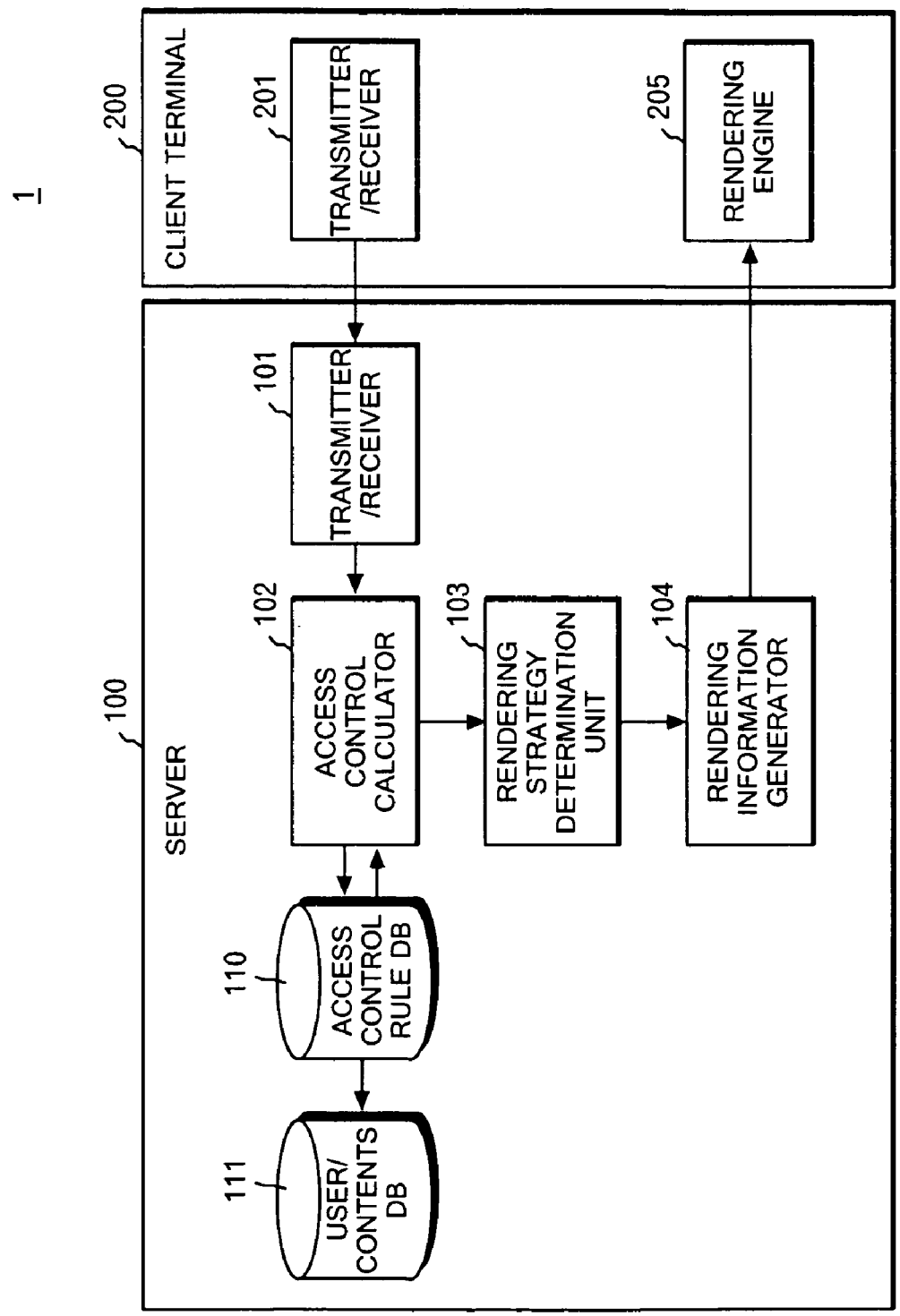
FIG. 12 is a diagram showing an exemplary system configuration of the client terminal and the server in a case where the present invention is applied to contents, such as a document on the web in accordance with an embodiment of the present invention.

Next, description will be given of a case in which the present invention is applied to contents, such as a document, on the web. In this case, as similar to the case of a virtual world, it is possible to perform control to allow intermediate access, for example, to allow the user to see 30% of the contents, instead of access control based on binary decision, to allow the user to access the entire contents or to not allow the user to access the contents at all. In the case of applying the present invention to contents, such as a document, on the web, the system configuration may be slightly different from that in the case of a virtual world. FIG. 12 is a diagram showing a basic system configuration of a client terminal and a server in the case of applying the present invention to contents, such as a document, on the web. In the system shown in FIG. 12, the avatar action controllers 101 and 201 in FIG. 2 are substituted with a transmitter/receiver 106 and a transmitter/receiver 206, and the avatar/object DB 111 in FIG. 2 is substituted with a user/contents DB 112. In the user/contents DB 112, information on the users and information on the contents to be the access object contents may be stored. Specific examples in which the present invention is applied to contents, such as a document, on the web will be described below.

SPECIFIC EXAMPLE 1

Figure 13:
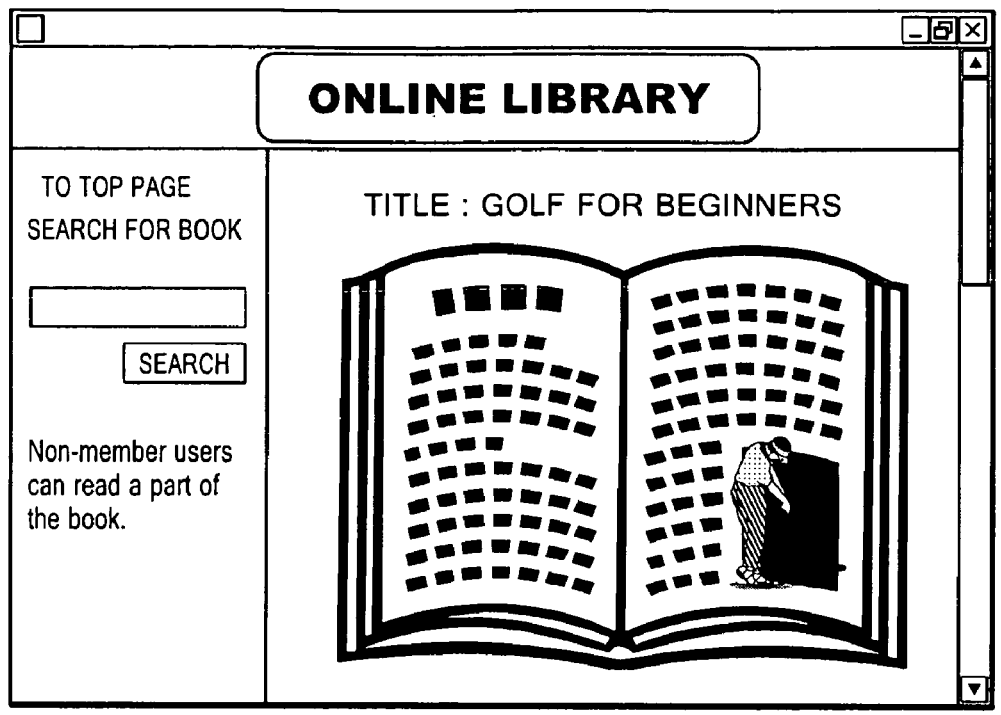
FIG. 13 shows an exemplary display of content of FIG. 12 for a paid member and an exemplary display of the same content to a non-member in accordance with an embodiment of the present invention.
Figure 13:
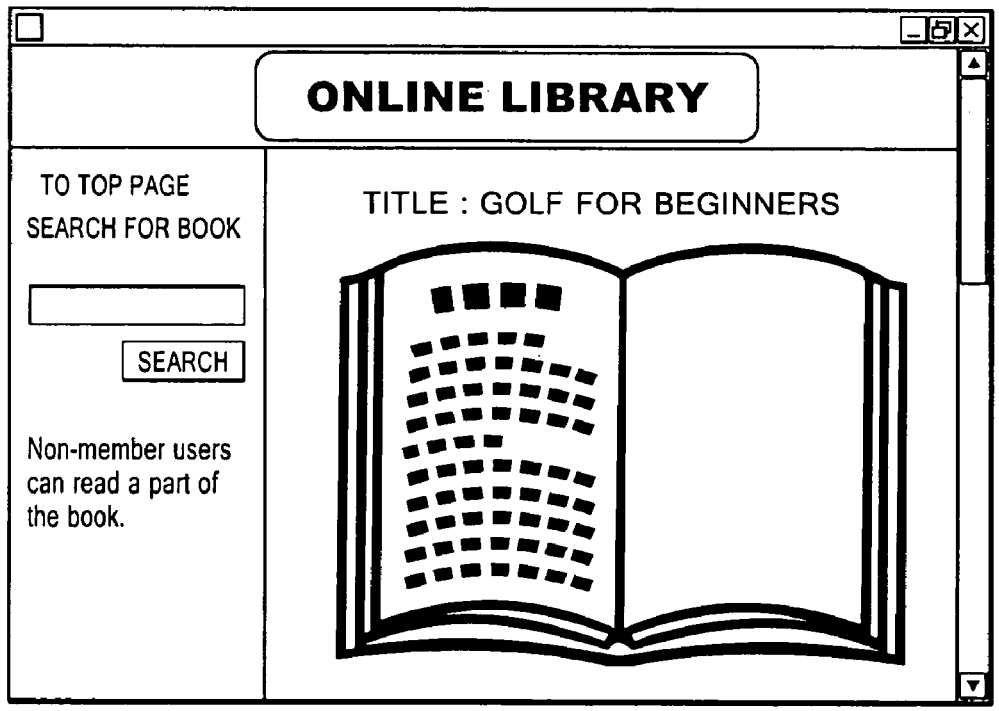

Assume that there is an online library, which is paid contents for reading books on the web. The users who have paid to become a member have the access right to read the whole content of each book, while the users who are not members have the access right to read only a part of each book. The amount each user can read may be determined in accordance with the access control value. When the access control value is 0.1, the user can read 10% of the whole book. FIG. 13 is views respectively showing a display for the members of the paid contents and a display for the users other than the members. The upper view in FIG. 13 is a display showing a book for the members, and the lower view in FIG. 13 is a display showing the book for non-members. As shown in the upper view in FIG. 13, members can read the whole book, but non-members can read only the amount determined in accordance with the access control value as described above, and hence cannot read any further than a certain point in the book as in the lower view in FIG. 13. In addition, for books such as photo collection books, it is also possible to perform control to show images made appear blurred to non-members by using the access control value as the clarity. Such access control of showing part of the paid contents by using the above-described functions can be used for content check or the like before purchase. Moreover, the contents creator can cut out the need of creating contents to be provided to the non-member users.

SPECIFIC EXAMPLE 2

The present invention can also be used for a case in which the users watch video contents on the web. In this case, the present invention can be used to perform control to allow, when the access control value is 0.3, the user to see the video with 30% clarity, or to see the video for the duration of 30% of the running time of the video. Such control can be used for content check or the like before purchase. Moreover, it is possible to show the video to non-members of the contents without preparing a video for preview. This can be used not only for video contents, for example, but also for music distribution contents.

[Example of Typical Hardware Configuration of Server and Client Terminal]

Figure 14:
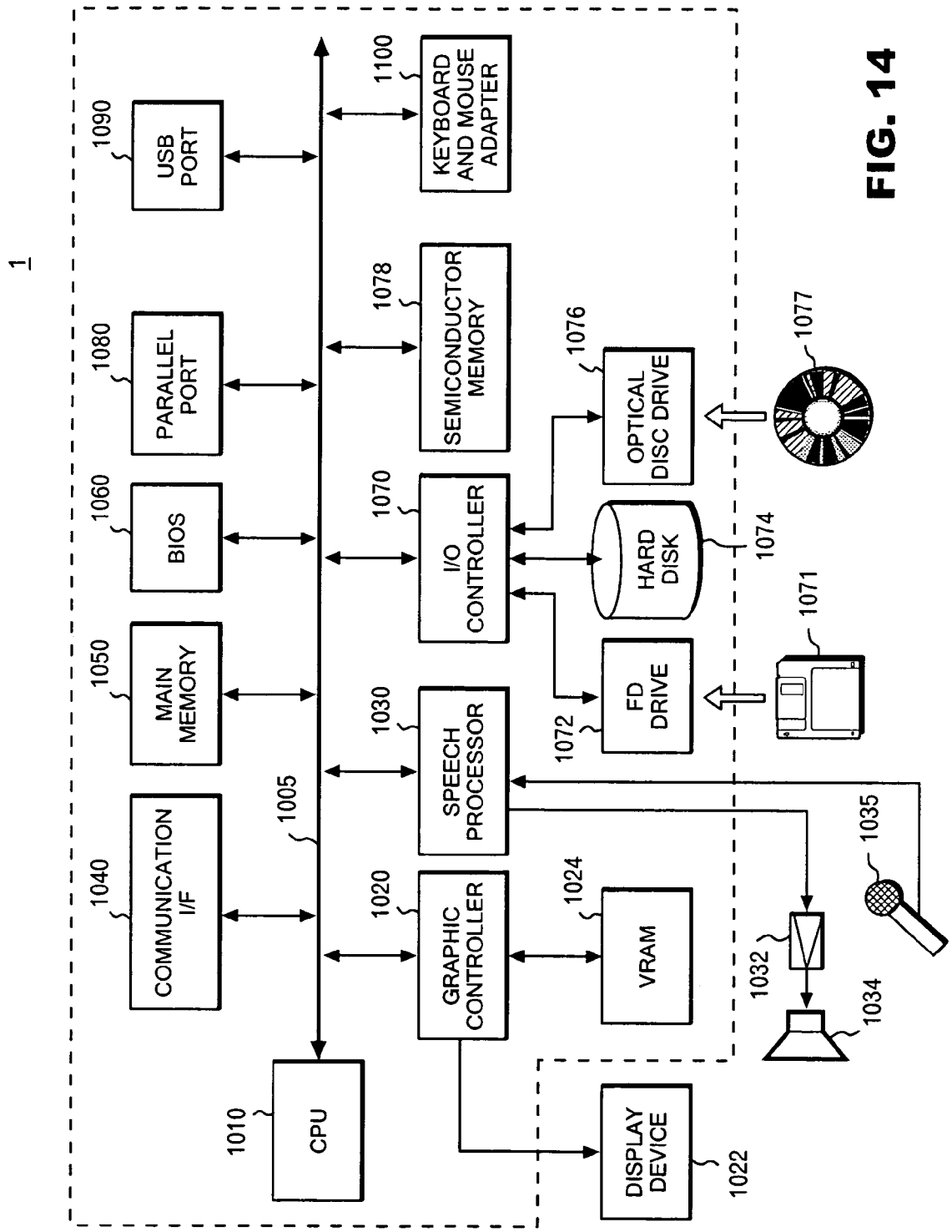
FIG. 14 is a diagram showing exemplary hardware configuration of a server and a client terminal in accordance with an embodiment of the present invention.

FIG. 14 is a diagram showing an information processing device 400 as an example of a typical hardware configuration of the server and the client terminal described above with reference to FIG. 1 and FIG. 2. An example of the hardware configuration of the information processing device 400 will be described below. The information processing device 400 includes a central processing unit (CPU) 1010, a bus line 1005, a communication interface (I/F) 1040, a main memory 1050, a basic input output system (BIOS) 1060, a parallel port 1080, a universal serial bus (USB) port 1090, a graphic controller 1020, a VRAM 1024, an audio processor 1030, an input output (I/O) controller 1070, and input means such as a keyboard and a mouse adapter 1100. A flexible disk (FD) drive 1072, a hard disk 1074 and an optical disk drive 1076, and storage means such as a semiconductor memory 1078, can be connected to the I/O controller 1070.

An amplifier circuit 1032, a speaker 1034, and a microphone 1035 are connected to the audio processor 1030. Moreover, a display device 1022 is connected to the graphic controller 1020.

The BIOS 1060 stores therein a boot program executed by the CPU 1010 when the information processing device 400 is started, a hardware dependent program of the information processing device 400, and the like. The FD drive 1072 reads a program or data from an FD 1071, and then provides the program or the data to the main memory 1050 or the hard disk 1074 through the I/O controller 1070.

As the optical disk drive 1076, a DVD-ROM drive, a CD-ROM drive, a DVD-RAM drive, or a CD-RAM drive, can be used, for example. In the case of using such a drive, an optical disk 1077 that is compatible with the drive needs to be used. The optical disk drive 1076 can read a program or data from the optical disk 1077, and can provide the program or the data to the main memory 1050 or the hard disk 1074 through the I/O controller 1070.

A computer program provided to the information processing device 400 is stored in a storage medium such as the flexible disk 1071, the optical disk 1077, or a memory card, and is then provided by the user. This computer program is read from the storage medium through the I/O controller 1070, or is downloaded through the communication I/F 1040, thereby being installed on the information processing device 400 to be executed. The operation which the computer program causes the information processing device 400 to perform is same as the operation performed by the above-described device of the embodiment, and hence, description of the operation is omitted here.

The above-described computer program may be stored in an external storage medium. As the storage medium, a magneto-optical recording medium such as an MD, or a tape medium can be used, in addition to the FD 1071, the optical disk 1077, and a memory card. Alternatively, a hard disk provided in a server system connected to a private communication network or the Internet, or a storage device such as an optical disk library, can be used as the storage medium to provide the computer program to the information processing device 400 through a communication network.

In the above example, the case of using the information processing device 400 is mainly described. However, it is also possible to install a program having the functions of the above-described information processing device onto a computer to cause the computer to operate as an information processing device. Thereby, the same functions as those of the above-described information processing device can be provided. Hence, the information processing device described as the embodiment of this present invention can also be implemented by the method and the computer program.

The device of the present invention can be implemented by hardware, software, or the combination of hardware and software. A typical example of the implementation by the combination of hardware and software is the implementation by a computer system with a specific program installed. In this case, the specific program is loaded into, and is then run in the computer system, so that the program causes the computer system to execute the processes according to the present invention. This program includes a set of instructions that can be written by any language, code or notation. Such a set of instructions is to enable the system to directly execute a particular function, or after performing one of, or both of, (1) conversion to another language, code or notation, and (2) duplication of the originally written language, code or notation for another medium. Moreover, the present invention includes, in its scope, not only such a program per se, but also a program product including a medium storing the program. The program for executing the functions of the present invention can be stored in any computer readable medium such as an FD, an MO, a CD-ROM, a DVD, a hard disk device, a ROM, an MRAM, or a RAM. To store the program in a computer readable medium, the program can be downloaded from another computer system connected through a communication network, or can be duplicated from another medium. Moreover, the program can be compressed, and thereby be stored in a single recording medium, or can be divided into a plurality of pieces, and thereby be stored in a plurality of recording media.

The present invention has been described above on the basis of the embodiment. However, the present invention is not limited to the above-described embodiment. Moreover, the effects of the present invention included in the description of the embodiment are only a list of preferable effects brought about by the present invention. Hence, the effects of the present invention are not limited to those described in the embodiment and the examples.

According to the present invention, by controlling access to data stored in a network resource by using an access control value that can be one of multiple values, a method for access control that is more flexible than a conventional method, as well as an access control server device and an access control system, each of which implements such an access control method, can be provided.

Although the preferred embodiment of the present invention has been described in detail, it should be understood that various changes, substitutions and alternations can be made therein without departing from spirit and scope of the inventions as defined by the appended claims.

I claim:

1. A computer-implemented method for controlling access to a plurality of data objects being accessed by one or more users, comprising
   receiving, by a processor, one or more requests for an access to a data object;
   searching a plurality of predetermined access control rules by using at least one of an information of a user requesting said access and an information associated with said data object;
   determining a value of an access control parameter for each of said one or more users requesting access to said data object;
   calculating an access control value for said data object; and
   modifying, for each of said one or more users requesting access to said data object, either said one or more requests or a value of said data object reported in response to said one or more requests; said modifying responsive to said access control value,
   wherein each of said plurality of predetermined access control rules is responsive to at least one access control parameter,
   wherein said access control value is calculated based on said values of said access control parameters for each of said one or more users requesting access to said data object,
   wherein said data object has a continuous value and a discrete value, and
   wherein said modifying includes scaling said data object proportionally to said access control value.

2. The method according to claim 1, wherein said plurality of predetermined access control rules includes access control rules comprising an rules for accessing an area.

3. The method according to claim 1, including limiting total number of accesses to the data object responsive to a value of an access control parameter.

4. The method according to claim 1, wherein said determining a value of an access control parameter includes calculating intermediate access parameter values for each of said two or more users and summing up said intermediate access parameter values to obtain said access control value if said one or more requests include concurrent requests from two or more users.

5. The method according to claim 4, wherein an intermediate access parameter value for one of said two or more users is calculated responsive to an intermediate access parameter value for at least one other of said two or more users.

6. The method according to claim 1, including setting said value of each said access control parameter to be a value of an access control parameter for one of said two or more users if said one or more requests include concurrent requests from two or more users.

7. The method according to claim 1, wherein said data object comprises an object in a virtual world.

8. A computer program product comprising a computer storage device readable medium including a computer program, wherein the computer program when executed on a computer connected to a computer network causes the computer to implement a method of controlling access data 5 stored at a network resources; said computer program product including code for: receiving one or more requests for an access to a data object; creating a table having one access control parameter entry for each of said one or more requests; calculating an access control value based on entries of said table; and fulfilling said one or more requests by reporting a modified value of said data object; said modified value calculated responsive to said access control value, wherein said data object has a continuous value and a discrete value, and wherein said modifying includes scaling said data object proportionally to said access control value.

9. A server device for controlling access to a plurality of data objects by one or more users, the server device comprising:
 a receiving unit for receiving one or more requests for an access to a data object;
 a search unit for searching a database for an access control rule using at least one of an information about a user and information about the data object; the database having a plurality of access control rules stored prior to receiving said one or more requests, and the access control rules each including an access control value;
 an access control value determination unit for determining the access control value using an access control rule retrieved said database; and
 an information converter for changing one of response information from the data object and the one or more access requests for the data object, said changing being responsive to said access control value,
  wherein said data object has a continuous value and a discrete value, and
  wherein said changing comprises scaling said data object proportional to said access control value.

10. The server device according to claim 9, wherein said changing comprises scaling said data object by a scale factor proportional to said access control value.

11. The server device according to claim 9, wherein when there are two or more users concurrently accessing the data object, the access control value determination unit sets an access value for at least one user to a sum of access value of at least two other users satisfying a first criterion.

12. The server device according to claim 11, wherein said first criterion is responsive to a measure of distance among said two or more users.

13. The server device according to claim 9, wherein, when there are two or more users concurrently accessing the data object, the access control value determination unit compensate a reduction in an access control value for at least one user by increasing an access control value for at least one other user by the same amount.

14. An access control system comprising a server, an access rule database, a storage and a plurality of client terminals of users communicatively coupled with each other, wherein the server comprises:
 a search unit which performs a search of said access rule database for an access control rule; said search responsive to an access control request to access a data object in said storage;
 a access control value determination unit for determining an access control value using an access control rule retrieved from said access rule database;
 an information converter for changing one of response information from the data object and the one or more access requests for the data object,
  wherein said data object has a continuous value and a discrete value, and
  wherein said changing is responsive to said access control value and includes scaling said data object by a scale factor proportional to said access control value; and
 a communication unit for communicating said response information to a client terminal of said access control request,
 wherein the access rule database includes comprises a plurality of predetermined access control rules, and
 wherein each of the plurality of client terminals includes an output converter for converting received response information into an output information.

15. The access control system according to claim 14, wherein the information converter further controls visual intensity of presentation of said data object.

16. The access control system according to claim 14, wherein the information converter further controls size of said data object.

17. The access control system according to claim 14, wherein said information converter further controls a speed of access of said data object by at least one user.

18. The access control system according to claim 14, wherein, when there are two or more users concurrently accessing the data object, the access control value determination unit calculates an access control value as a sum of access control values of said two or more users.

* * * * *